April 16, 1963  D. W. SCOFIELD  3,086,101
HEATERS
Filed May 17, 1956  2 Sheets-Sheet 1
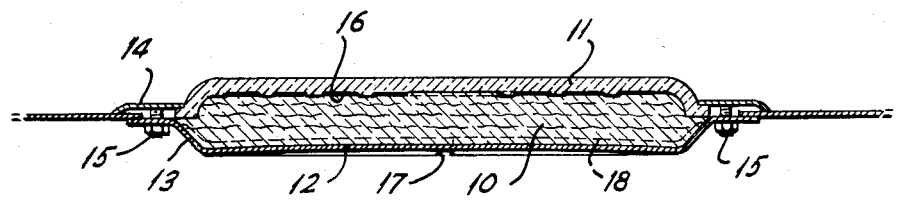
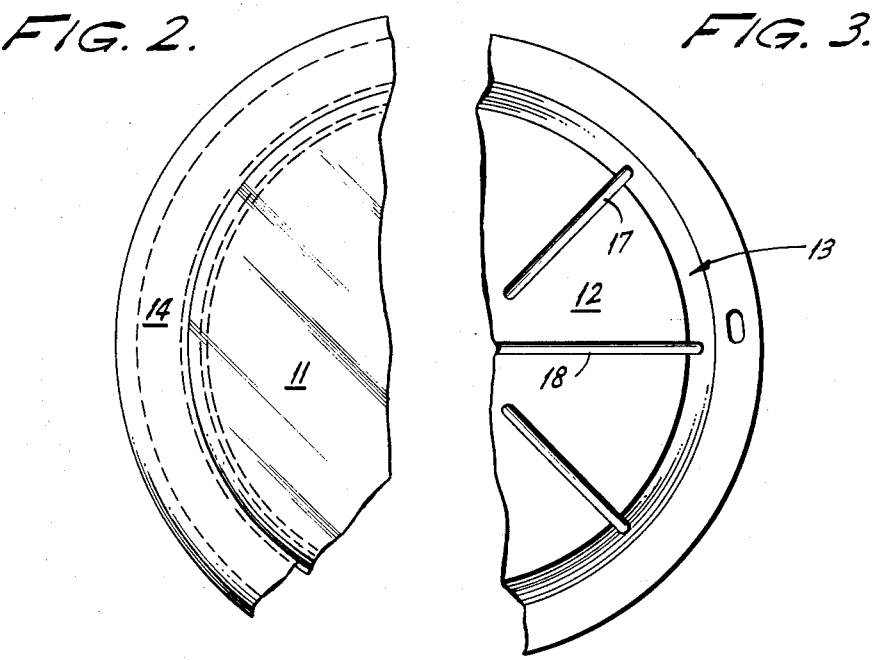
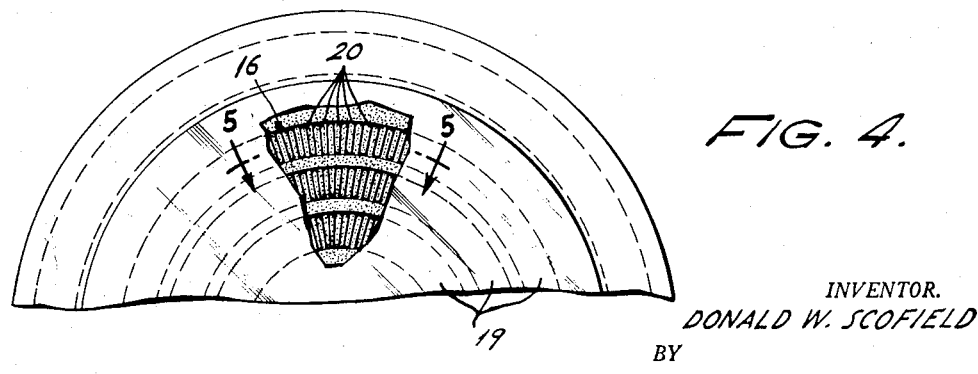
INVENTOR.
DONALD W. SCOFIELD
BY
AGENT April 16, 1963     D. W. SCOFIELD     3,086,101
HEATERS Filed May 17, 1956                               2 Sheets-Sheet 2

INVENTOR.
DONALD W. SCOFIELD
BY
Carl H. Synnestvedt
AGENT

United States Patent Office 3,086,101
Patented Apr. 16, 1963

3,086,101
HEATERS
Donald W. Scofield, Glenside, Pa., assignor, by mesne assignments, to Philco Corporation, Philadelphia, Pa., a corporation of Delaware
Filed May 17, 1956, Ser. No. 585,437
21 Claims. (Cl. 219—37)

The invention hereinafter described and claimed relates to heaters and particularly to an improved electrical heater for cooking ranges and similar domestic appliances. The improvement provides increased thermal efficiency and more permanent preservation thereof, in a heater of the type comprising a plate which may support a cooking vessel and which has a heating element held in contact with the underside of the plate; the plate being heat transmissive and being resistant to destructive effects of heat and of mechanical shock and also resistant to the physical and chemical attacks of fluids which may come into contact with the top of the plate.

Many efforts have been made in the past to construct heaters of this kind but none of the prior constructions combines a high degree and long preservation of efficiency as to heat transmission with satisfactory resistance to the various dangers. The well-known metallic heater plates and tubular heaters with a metal sheath provided good resistance to shock and to penetration by fluids, but required several compromises as to heat transfer, since dielectric materials had to be used to avoid short-circuiting of a heating wire and since there was either downward loss of reflected heat energy, when imperforate plates were used, or objectionable collection of waste materials when heater coils and upwardly reflecting pans were used; also, most of the metallic enclosures practically available were subject to corrosion, discoloration or the like.

On the other hand, there have been developed electrically insulating, thermally transmissive materials which are highly wear and shock resistant, including for instance the glass-like substance or so-called high-silica glass sold by Corning Glass Works under the trade name Vycor; and some of the developments in the field of heaters have used plates of such materials. Heretofore, however, the rates of heat transfer obtained with such glasses were either too low from the start or likely to become too low as time went on and as heater elements were subject to inherent expansion and contraction cycles and to the various secondary effects of such cycles. In addition, the period of useful service was not always as long as desired; it was often cut short by premature burning out of the heater wire or cracking of the glass, due to local overheating at points where uniform surface contact of wire and glass was absent or was gradually lost.

It is a general objective of this invention to overcome these difficulties and to provide a heating unit of the glass plate type which has high thermal efficiency, throughout a long service life, together with an equally high and equally persistent ability to withstand thermal shock, mechanical impact, hydraulic seepage, chemical attack and the like.

I have discovered that substantial improvement along these lines is possible by using a novel combination of surface heater elements, including a resiliently compressible and compressed pad or mat of certain ceramic fiber materials or the like, underlying a hot wire or ribbon which in turn underlies a plate of said Vycor glass or the like. Such a pad can be arranged to provide and permanently maintain distributed surface contact and pressure and consequently to provide and maintain distributed thermal coupling between the hot wire and the plate, thereby not only originally promoting but permanently safeguarding the transfer—and particularly the conductive transfer—of heat from the wire to the heater plate. Radiant transfer of heat to and through the plate of glass or the like can also be utilized, in addition to the aforementioned, improved conductive transfer of heat to the plate; but in order to insure maintenance of the highest possible efficiency of total heat transfer, particular improvement was found to be necessary—and was also found to be available by the use of said resilient means—in the establishment and preservation of the conduction of heat from a surface of the heating element substantially direct to a contacting surface of the heater plate. Such improvement, then, is one of the basic aspects and principal objects of this invention.

It is a more particular object of my invention, seen in this aspect thereof, to improve over the apparatus disclosed in my copending application Serial No. 503,667, filed April 25, 1955, now Patent #2,833,908, entitled "Electrical Heating Unit" and assigned to the assignee of the present invention. In the heater of said copending application, an electrical heating element has a surface, particularly a flat surface, in mechanical contact and thermal coupling with a surface of a heat conductive plate of glass or the like; and distributed pressure is applied for maintaining such contact, by an element-supporting, heat-insulating body, such as a plate of silica foam. According to a specific feature described in said copending application the uniformity of pressure distribution may be enhanced by a surface layer of refractory mortar or the like, bonded to the silica foam plate, said layer facing the overlying glass plate and embedding part of the heating element. The present invention, on the other hand, obtains and maintains intimate and distributed thermal coupling between surfaces of a hot wire and of a conductive plate, with equal or improved efficiency and with greater durability, by certain features, including particularly the use of a resilient, insulating body, pressed against the heating element and pressing it against the conductive plate.

The new structure, in a preferred form thereof, can therefore be visualized, basically, as a three-layered "sandwich" which comprises when oriented in the frequently used horizontal arrangement, an uppermost, rigid, high-silica glass plate; a next lower, flexible heating element such as a thin hot wire of suitable resistor metal; and, below and partly around this element, a resilient heat insulating body, such as a mat or pad of ceramic fiber material. In practice, additional layers may be used or may be inherently formed, including a rigid support plate in lowermost position, or a compacted mass of fibers adjacent the heating element, or a coating of metal oxide on the glass plate, or combinations of such masses or layers.

It is a further important and basic object of my invention, seen in another aspect thereof, to provide and preserve improved physical conditions in certain interface layers of the heating element. Particular reference is made to the interface of that element with the heater plate. I have discovered the fact that certain constituents of efficient and desirable heater elements tend to migrate through such an interface layer, as heretofore constructed, thereby reducing the useful service life of the heater unit. I have further discovered that such loss can be minimized or prevented by a very simple coating on the glass and that, while such a coating may slightly reduce the radiant transfer of heat or of light or of both, which may otherwise be available, the overall reduction of heat transfer can be kept to a negligible value, since a suitable coating adds to the sustained efficiency of conductive transmission of heat into the glass. Also, the optical opacity or partial opacity of the plate, obtained in this manner, is quite advantageous from an appearance standpoint, in a kitchen appliance. Thus it is among the particular objects of the invention to maintain interface conditions which add to the service life of the heater, improve the appearance of the heater, and preserve or improve the heating efficiency.

In pursuance of these further objects the new and preferred structure can be visualized as a sandwich construction including a first main layer of high-silica glass; a second main layer, provided by a convoluted metallic wire; and, as a coating between these main layers, a film of a fairly heat-conductive, electrically insulating substance adapted to prevent migration of metal constituents or compounds into the silica glass. As a particular example, an aluminum oxide film, a few thousandths of an inch thick, has been found most useful in certain cases. Such a film may be opaque to non-radiating objects but may be translucent to the heating wire when the latter is at a red or orange glow.

A particularly high degree of sustained efficiency is available when the resilient pad, below the heater wire, is used together with the protective film, above the heater wire. However these two expedients are independent of one another in principle and each of them, when used alone, provides a material improvement over the constructions previously available in this art.

Referring now to the drawing appended hereto, FIGURE 1 is a transverse sectional view showing a preferred form of a heater in accordance with this invention. FIGURES 2 and 3 are, respectively, partial plan and bottom views of said heater. FIGURE 4 is a partial plan view of the heater, with parts broken away.

Figure 5:
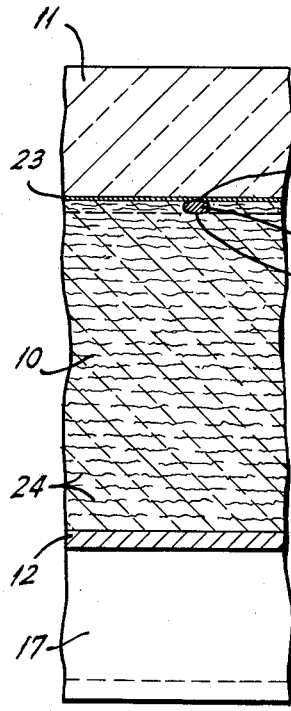
FIGURE 5 is an enlarged view taken along line 5—5 in FIGURE 4 and showing details of the preferred embodiment of FIGURE 1.

Referring first to FIGURES 1 to 3, the aforementioned resilient mat or pad 10, desirably forming a porous mass of ceramic fibers, is shown as being compressed between a rigid glass-like plate 11 and a metallic sheet 12; said sheet having an upstanding flange 13 for confining the resilient material and for holding the plate 11 with the aid of a companion flange 14 and of fastening means 15. Thus an electrically conductive heating element such as a hot wire or ribbon 16, interposed between mat 10 and plate 11, is resiliently pressed against the lower surface of the plate 11, by the mat 10, along the entire length of the wire or ribbon, this wire or ribbon being flexible and being convoluted so as to facilitate flexing it into full or broad contact with the lower surface of the plate.

The ceramic fiber mat 10 may desirably be formed of materials such as those marketed under the trade names "Thermoflex" (made by Johns Manville Corporation) or "Fiberfrax" (made by The Carborundum Corporation), some of which comprise, as a major constituent, fibers of aluminum silicate.

The glass plate 11, metal pan 12, 13 and flange 14 also serve to enclose the resilient fiber mat 10 and thus to protect it and the heating wire 16 from moisture.

The metallic sheet 12 and flange 13 desirably have radial channels 17 incorporated therein so as to form a rigid pan 12, 13 and thus to avoid irregularities of mechanical pressure and thermal coupling applied to different sections of the wire 16. It is particularly preferred to form the sheet 12 as a dished member, convex toward the plate 11, and to secure it against reverse bending by extending at least one of the channels, 18, diametrically through the entire width of the sheet.

As illustrated in FIGURE 4, wire 16 may have a plurality of major convolutions 19, which may form for instance a flat spiral coaxial with the heater unit; and each major convolution desirably has a plurality of minor convolutions 20 which may form for instance a meander or zig zag pattern along and in the plane of the flat spiral. Such an arrangement is particularly suitable for contacting substantially the entire length of a very elongated wire 16 directly, intimately and permanently with the lower surface of the plate 11, avoiding unequal heat effects and related problems; at least such contacting can be achieved if proper contacting aids are used, in conjunction with the reinforced pan, the convoluted wire and the resilient mat, as will now be described.

In FIGURE 5 a wire 16 is illustrated as having flattened cross-sectional configuration, so that it has flat and extended upper and lower surfaces 21, 22. The entire upper surface 21 is in broad contact with the underside of an aluminum oxide film 23 on the lower glass surface, while the lower surface 22 of the wire exposes a large area to the upward pressure, applied thereto by the fibers 24 of the resilient insulator mat 10.

This mat may, as mentioned, consist of Thermoflex or Fiberfrax materials or the like, and more particularly of a fairly loose and light form of such material, free from pellets and the like and with an average length of the fibers 24 which exceeds the width of the wire surface 22. The plastic binder, if any, which holds the fibers together is desirably of a heat-resistant type and of small volume, so as to minimize compacting of fibers even adjacent the hot wire.

Figure 6:
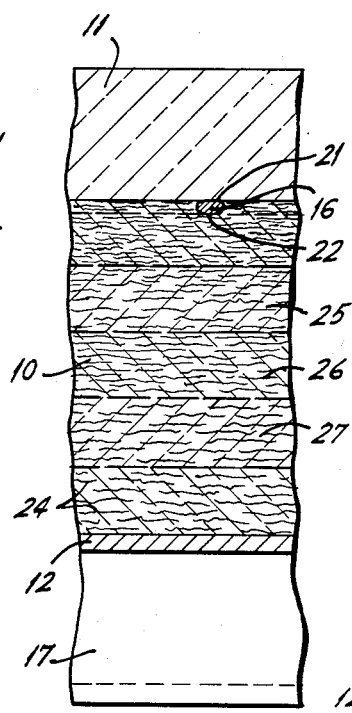
FIGURES 6 and 7 are views generally similar to FIGURE 5 but showing, respectively, details of a second and third embodiment.

As shown in FIGURE 6, it is possible to omit the film 23 and to dispose the upper wire surface 21 in direct contact with the lower glass surface; contact pressure being applied to a broad, downwardly facing wire surface 22 by portions or particles 24, such as fibers forming part of the resilient pad 10.

Here as well as in other embodiments of this invention, the pad may comprise a plurality of layers 25, 26, 27. These layers, as mentioned, should be resilient. In actual service they are likely to have downwardly increasing resilience, since the operation of the heater and insulator inherently involves the existence of higher temperatures in upper parts of the insulating mat and relatively lower temperatures in lower parts thereof, thereby leading to a relatively higher tendency toward melting of binder materials and consequent compacting of fibers, in upper layers of the mat. The desirable reduction of temperature in the lower parts of the mat may be promoted to some extent by upward reflection of radiated heat at the interfaces of layers 25, 26, 27, etc., in addition to the more basic insulating effects of the mat.

Figure 7:
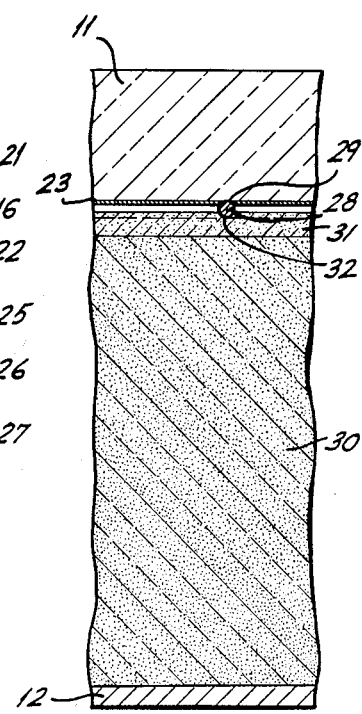

In the further modification of FIGURE 7, there is shown a relatively heavy film 23, which may be bonded to the underside of the glass plate 11. The electrical heater conductor wire 28 has an upper surface 29 at least partially embedded in this film 23. In such a construction the flattening of the cross-section of the wire is less important than in the forms of FIGURES 5 and 6, and there is therefore shown a wire of plain, circular cross-section. The heat transmission coupling of the wire with the plate is still very efficient. The thickness of the layer 23 is shown with some exaggeration in the present FIGURE 7, as well as in FIGURES 5 and 8.

The embodiment of FIGURE 7 is also modified with respect to the insulating body, which here comprises a non-resilient, rigid plate 30. The reinforcing ribs 17, 18 of the pan 12, 13 can then be omitted; but the pan itself is desirably retained, in the interest of moisture control, when the plate 30 is porous. As disclosed in my said earlier application, good insulation, for present purposes, has been obtained by a porous plate 30 of silica foam, with a layer 31 of refractory mortar, interposed between the plate 30 and the glass plate 11. In the fabrication of the heater the mortar may be plastic and the wire 28 may be pressed into the same by the glass plate, thereby conforming the wire accurately to the shape of the plate; and when the normal set has taken place, the mortar holds and partially embeds the lower surface 32 of the wire.

Figure 8:
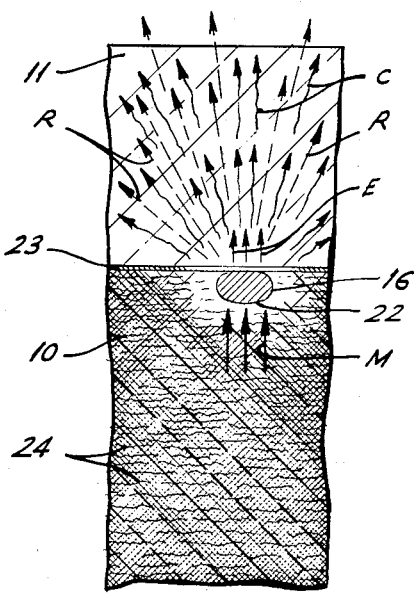
FIGURE 8 is still another view generally similar to FIGURE 5 and showing, schematically, the operation of the device.

The operation of a device in accordance with FIGURE 5 is schematically shown in FIGURE 8. The heating element 16 may be red-hot, having a temperature of about 1800 degrees Fahrenheit in many cases. At such a temperature, heat has been found to pass through plates 11 of ⅛ inch average thickness at a rate of about 35,000 B.t.u. per hour per square foot.

Mechanical pressure M is applied and distributed over the extended lower surface 22 of the heating element 16, by the resilient and partially compressed fiber structure of the mat 10, supported by the rigid bottom plate 12 on the one hand and confined by the rigid top plate 11 on the other hand. Fibers 24 adjacent the hot element 16 may compact, but the more remote fibers retain downwardly increasing degrees of resilience, so that the mat 10 is capable of a long and practically indefinite period of use in uniformly distributing the force M. Such uniform distribution is maintained even in the event that the surfaces of the flexible wire 16 or of the plate 11, or both, are seriously warped or deformed, which may happen because of unavoidable incidents of mass-fabrication and also because of thermal effects in actual use. Thus the provision and use of the above-described, insulating interface 10, 22 between the fiber wool mat and the heater wire has particular efficiency for the purpose of obtaining and maintaining close, uniform and permanent thermal coupling at the conducting interface 21, 23, 11 of wire, film and glass.

Figure 9:
FIGURE 9 is a greatly enlarged detail from FIGURE 8.

This latter interface 21, 23, 11 is shown, greatly enlarged, in FIGURE 9; it being understood that this figure is hypothetical and highly schematic and that I do not wish to be bound to any specific theory based thereon or details shown therein. As illustrated here and in FIGURE 8, heat energy E of the glowing wire 16 passes readily into the thin film 23, because of the efficient coupling available when contacting any hot metallic body and particularly a hot aluminum alloy wire by a body of aluminum oxide. Likewise the further transfer of said energy into and through the glass plate 11 has been found most effective. As shown in FIGURE 8, such transfer occurs largely by conductive flow C of heat through the interface 21, 23, in addition to the radiant transmission R of heat which is also allowed by the last mentioned interface, the film 23 and the glass plate 11.

For the purpose of improving heating efficiency and economy, I have found it particularly desirable to construct the heater element 16 of a metallic mixture or alloy such as that known as Kanthal (sold by Aktiebolaget Kanthal, a Swedish company), containing a preponderance of iron and an admixture of other metals including aluminum. One difficulty was previously encountered when such wires were used; under the effect of high temperatures, the wire broke down after certain, all too short periods of service. It appeared that aluminum or alumina, forming part of or formed in the mixture or alloy of substances in the body or surface portions of the wire, found its way into bottom surface layers of the glass plate 11, which layers may develop into a kind of absorbent silica frit F, FIGURE 9. There is evidence that aluminum actually tends to boil out of interstices I between grains of other metals, to evaporate and migrate away from the wire. Concentrations of aluminum were formed in relatively cool portions of the underside of an originally uncoated glass plate, where the metal vapor apparently condensed.

The use of the aluminum oxide layer 23 has completely eliminated this premature breaking down of the wire. It appears that even a very thin layer of this material, which practically does not interfere with the heat transfer, keeps the silica frit F saturated, so that none of the aluminum from the heating wire enters the same. I have obtained the best overall results with a thickness of film 23 ranging from three to eight thousandths of an inch, and preferably amounting to about five thousandths of an inch.

As indicated above, the specific film 23 of FIGURES 5 and 7 to 9 can be modified and other materials can be used therein, when other types of heater wire are used. The film 23 can be omitted entirely, as in FIGURE 6, when a heating element 21 is used which does not tend to break down upon the prolonged heating of aluminum or similar constituents. It is then particularly desirable that distributed surface contact should be provided between the wire and the glass plate, for instance by flattening the wire.

Modifications are also possible in other respects. For instance, a rigid insulator, such as that of FIGURE 7, has particular advantages in cases where the use of metallic members 12, 13 or 14 is undesirable; and when formed or combined with an originally plastic surface layer, the rigid insulator is particularly suitable in cases where the lower surface of the glass plate or other heater plate 11 has significant departures from truly planar configuration. This applies whether a thin interface film 23 be used or not.

On the other hand, the resilient insulator of FIGURES 5 or 6 is more resistant to mechanical shock, which is an advantage in cases such as those of household heaters, where the heater unit must withstand heavy loads over extended periods of time, desirably without repair or replacement of parts. A further advantage of the embodiments of FIGURES 5 and 6 is that very simple fasteners 15 and flanges 13, 14 can here be used with success, whereas in some uses of the form of FIGURE 7, the use of precision fasteners is a more critical matter. In addition, the maintenance of proper coordination between the heater element and the heater plate is automatic in the form of FIGURES 5 and 6, whereas such maintenance may require careful readjustments in at least some applications of FIGURE 7, because of the often minute but yet significant warping tendencies of heater elements and heater plates.

It may be noted that all of the embodiments shown are capable of avoiding an effect which has been encountered when a heater element was enclosed or embedded in a more or less homogeneous glass plate: they can greatly reduce the heat lag or thermal flywheeling which occurs when heavy thermal mass is present above and below the heater element.

Heretofore, such reduction of thermal mass required the use of heating elements, such as gas nozzles or electrical conductors with tubular sheath protection, which elements extended across a hollow space, called a reflector pan in case of the sheath type conductor units. Those earlier elements allowed troublesome accumulations of dirt, such as the spillage of cooking vessels, in said pans; and the sheath type conductor units were definitely limited in efficiency of heat transfer and rapidity of starting and stopping operations. The new heater, by contrast, avoids all trouble of this kind; and it differs from the sheath types as well as from former plate type heaters by a great increase in thermal efficiency obtained and maintained and by a greatly extended period of useful service. The improvement in efficiency of heat transfer in comparison with the prior sheath type heaters and also in comparison with the best prior plate type heaters amounts to eight to ten percent.

While only three embodiments of the invention and one mode of operation thereof have been described, it should be understood that the details thereof are not to be construed as limitative of the invention, except insofar as set forth in the following claims.

I claim:

1. In a heater, a rigid plate of glass-like material and a rigid plate of metal, said plates forming a flat chamber therebetween; an elongated, electrically conductive element having an extended surface in contact with a surface of said rigid plate of glass-like material; and a resilient, heat insulating mat or pad disposed in said chamber, in contact with the conductive element opposite the plate and reacting between said rigid plates, for maintaining distributed pressure between said surfaces.

2. In a heater as described in claim 1, the added feature that the resilient heat insulating mat or pad consists substantially entirely of refractory material.

3. In a heater as described in claim 1, the added feature that the mat or pad has fibrous structure.

4. In a heater as described in claim 3, the added feature that the mat or pad consists, in substance, of ceramic fibers.

5. In a heater as described in claim 4, the added feature that the fibers consist in substance of aluminum silicate.

6. In a heater as described in claim 1, the added feature that the mat or pad contains fibers which are longer than said extended surface is wide.

7. In a heater as described in claim 1, the added feature that the mat or pad comprises a plurality of layers of generally similar material.

8. In a heater as described in claim 7, the added feature that said layers are increasingly resilient in a direction away from the conductive element.

9. In a heater as described in claim 1, the added feature that the conductive element substantially extends in a single plane.

10. In a heater as described in claim 1, the added feature that the conductive element has a plurality of major convolutions, each having a plurality of minor convolutions, said major and minor convolutions providing said extended surface.

11. In an electrical heater, a heat conductive, electrically insulating plate; a film of an aluminum compound on one surface of said plate; a metallic heating element containing aluminum, said element having an extended surface in contact with said film; and means for maintaining pressure between said heating element and said film.

12. In a heater as described in claim 11, the added feature that the last mentioned means is adapted to maintain distributed pressure between said element and said film.

13. In a heater as described in claim 12, the added feature that the last mentioned means comprises a resilient, heat insulating mat or pad.

14. In a heater as described in claim 11, the added feature that said film has a thickness ranging from about three-thousandths to about eight-thousandths of an inch.

15. In a heater as described in claim 14, the added feature that said film has a thickness of approximately five-thousandths of an inch.

16. In a heater, a rigid plate of glass-like material and a rigid plate of metal, said plates forming a flat chamber therebetween; an elongated, electrically conductive heating element disposed in said chamber, in broad contact with said plate of glass-like material; and a resilient, heat insulating mat or pad in said chamber, reacting between said rigid plates to maintain distributed pressure between contacting surfaces of said plate of glass-like material and said heating element.

17. In a heater as described in claim 16, the added feature that said plate of glass-like material consists of a high-silica glass.

18. In a heater as described in claim 16, the added feature that said chamber is enclosed by substantially moisture impervious means comprising said plates.

19. In a heater as described in claim 16, the added feature that the metal plate is reenforced against bending.

20. In a heater as described in claim 16, the added feature that the metal plate is curved in cross-section and is reenforced against any material change of the curvature, which otherwise could be effected by said pressure.

21. In a heater as described in claim 16, the added feature that the heating element comprises aluminum and that the plate of glass-like material has a heat conductive coating thereon, wherein the heating element is partially embedded, and which consists substantially of aluminum oxide.

References Cited in the file of this patent

UNITED STATES PATENTS

| | | |
|---|---|---|
| 1,120,259 | Wiegand | Dec. 8, 1914 |
| 1,945,742 | Hilger | Feb. 6, 1934 |
| 2,152,126 | Young | Mar. 28, 1939 |
| 2,164,650 | Goldthwaite | July 4, 1939 |
| 2,345,300 | Simpson et al. | Mar. 28, 1944 |
| 2,511,540 | Osterheld | June 13, 1950 |
| 2,640,906 | Haynes | June 2, 1953 |
| 2,913,565 | Von Kantzow | Nov. 17, 1959 |